United States Patent
Landry

(10) Patent No.: US 9,292,277 B2
(45) Date of Patent: Mar. 22, 2016

(54) METHODS AND DEVICES FOR UPDATING FIRMWARE OF A COMPONENT USING A FIRMWARE UPDATE APPLICATION

(75) Inventor: John Landry, Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 765 days.

(21) Appl. No.: 13/386,667

(22) PCT Filed: Dec. 18, 2009

(86) PCT No.: PCT/US2009/068701
§ 371 (c)(1),
(2), (4) Date: Jan. 23, 2012

(87) PCT Pub. No.: WO2011/075139
PCT Pub. Date: Jun. 23, 2011

(65) Prior Publication Data
US 2012/0124567 A1    May 17, 2012

(51) Int. Cl.
*G06F 9/445* (2006.01)
*G06F 11/14* (2006.01)
*G06F 3/12* (2006.01)

(52) U.S. Cl.
CPC ............ *G06F 8/665* (2013.01); *G06F 11/1433* (2013.01); *G06F 3/123* (2013.01); *G06F 8/60* (2013.01); *G06F 8/61* (2013.01); *G06F 8/65* (2013.01)

(58) Field of Classification Search
CPC ..... G06F 8/65; G06F 11/1433; G06F 21/572; G06F 9/4416; G06F 11/1417; G06F 11/1469; G06F 3/1225; G06F 11/0766; G06F 8/60; G06F 8/61; G06F 3/123
See application file for complete search history.

(56) References Cited

U.S. PATENT DOCUMENTS 6,594,723 B1 * 7/2003 Chapman .................. G06F 8/65
711/103
7,143,275 B2   11/2006 Cepulis et al.
(Continued)

FOREIGN PATENT DOCUMENTS

TW    200604934 A    2/2006
TW    200638200 A   11/2006
TW    200713037 A    4/2007

OTHER PUBLICATIONS

Cristiano Guiffrida et al., Safe and Automatic Live Update for Operating Systems, ACM 2013, retrieved online on Nov. 24, 2015, pp. 279-291. Retrieved from the Internet: <URL: http://delivery.acm.org/10.1145/2460000/2451147/p279-giuffrida.pdf?>.*

(Continued)

*Primary Examiner* — Thuy Dao
*Assistant Examiner* — Hanh T Bui
(74) *Attorney, Agent, or Firm* — Hewlett-Packard Patent Dept.

(57) ABSTRACT

Example embodiments relate to methods for updating firmware of a hardware component included in a computing device. An example method may store an executable firmware update for the hardware component on a machine-readable storage medium. The method may then initiate a firmware update application by a firmware-to-operating system (OS) interface upon boot-up of the computing device. Finally, the method may trigger update of the firmware of the hardware component by starting execution of the executable firmware update. Related computing devices and machine-readable storage media are also disclosed.

17 Claims, 7 Drawing Sheets

(56) References Cited

U.S. PATENT DOCUMENTS

| | | | |
|---|---|---|---|
| 7,191,328 B2 | 3/2007 | Hobson | |
| 7,203,831 B2 | 4/2007 | Wu et al. | |
| 7,222,339 B2 | 5/2007 | Rothman et al. | |
| 7,363,482 B2 | 4/2008 | Zimmer et al. | |
| 7,457,945 B2 | 11/2008 | Dailey et al. | |
| 8,316,361 B2* | 11/2012 | Watson | G06F 8/65 717/168 |
| 8,869,282 B1* | 10/2014 | Lazarowitz | G06F 21/566 713/189 |
| 2002/0083427 A1 | 6/2002 | Li | |
| 2004/0076043 A1 | 4/2004 | Boals et al. | |
| 2004/0148596 A1* | 7/2004 | Watson | G06F 8/65 717/168 |
| 2004/0230963 A1* | 11/2004 | Rothman | G06F 8/65 717/168 |
| 2004/0255286 A1* | 12/2004 | Rothman | G06F 8/65 717/168 |
| 2005/0160257 A1* | 7/2005 | Kruger et al. | 713/2 |
| 2005/0216753 A1 | 9/2005 | Dailey et al. | |
| 2005/0223291 A1* | 10/2005 | Zimmer | G06F 11/1433 714/34 |
| 2006/0123223 A1 | 6/2006 | Mayfield et al. | |
| 2007/0300050 A1* | 12/2007 | Zimmer | G06F 8/65 713/1 |
| 2008/0046877 A1 | 2/2008 | Ford | |
| 2008/0077973 A1 | 3/2008 | Zimmer et al. | |
| 2008/0209193 A1 | 8/2008 | Zhang et al. | |
| 2009/0241103 A1 | 9/2009 | Pennisi et al. | |
| 2009/0249120 A1 | 10/2009 | Yao et al. | |
| 2009/0254898 A1 | 10/2009 | Sareen et al. | |
| 2009/0300595 A1* | 12/2009 | Moran | G06F 8/65 717/170 |
| 2011/0197185 A1* | 8/2011 | Hobbet | G06F 11/1433 717/168 |
| 2012/0210315 A1* | 8/2012 | Kapadekar | G06F 8/65 717/172 |
| 2013/0125107 A1* | 5/2013 | Bandakka | G06F 8/665 717/171 |
| 2014/0047428 A1* | 2/2014 | Prakash | G06F 8/65 717/168 |
| 2014/0068594 A1* | 3/2014 | Young | G06F 21/572 717/172 |
| 2014/0189673 A1* | 7/2014 | Stenfort | G06F 8/65 717/170 |
| 2015/0169316 A1* | 6/2015 | Cavalaris | G06F 8/65 717/168 |

OTHER PUBLICATIONS

Jacob Maskiewicz et al., Mouse Trap: Exploiting Firmware Updates in USB Peripherals, 2014, retrieved online on Nov. 24, 2015, pp. 1-10. Retrieved from the Internet: <URL: https://cseweb.ucsd.edu/~hovav/dist/mouse.pdf>.*

Extended Search Report received in EP Application No. 09852398.8, mailed on Oct. 17, 2013, 6 pgs.

Notification of Transmittal of the International Search Report and the Written Opinion of the International Searching Authority, or the Declaration, Hewlett-Packard Development Company, L.P., et al., International Application No. PCT/US2009/068701 filed Dec. 18, 2009, Date of Mailing: Aug. 23, 2010, pp. 1-9.

International Preliminary Report on Patentability, international Application No. PCT/US2009/068701, Date of Mailing: Jun. 28, 2012, pp. 1-6.

* cited by examiner

METHODS AND DEVICES FOR UPDATING FIRMWARE OF A COMPONENT USING A FIRMWARE UPDATE APPLICATION

CROSS-REFERENCE TO RELATED APPLICATION

This application is a national stage application under 35 U.S.C. §371 of PCT/US2009/068701, filed Dec. 18, 2009.

BACKGROUND

Hardware components used in desktop computers, laptops, and other computing devices typically include firmware, a combination of hardware and executable instructions that control the low-level functionality of the component. Firmware enables the interaction between hardware components installed in a computing device and is therefore critical to the proper operation of the computing device. As an example, a hard drive generally includes firmware that configures the drive upon power-up, interprets and executes instructions from the processor, and safely powers down the drive.

As with any program, the instructions used in implementing the firmware of a hardware component are susceptible to bugs and other problems, which are occasionally present in a component purchased by an end user. In situations where the bug will affect performance or render the component unusable, the manufacturer may find it necessary to release a firmware update to correct the problem. A manufacturer may also release a firmware update to add additional features or improve performance of the component.

Developing and installing a firmware update is often a complex, error-prone process. A manufacturer of a hardware component must typically spend a significant amount of time to custom develop an installer for a firmware update. Furthermore, a typical firmware update process requires substantial interaction from the user, thereby negatively affecting the user's quality of experience and increasing the likelihood of a damaged component. In the ever-competitive personal computer business, the time and costs required to develop, install, and troubleshoot firmware updates can result in a measurable effect on profit margins of the manufacturer and cause a decrease in customer satisfaction.

BRIEF DESCRIPTION OF THE DRAWINGS

In the accompanying drawings, like numerals refer to like components or steps. The following detailed description references the drawings, wherein.

DETAILED DESCRIPTION

As detailed above, the time and costs required to develop, install, and troubleshoot firmware updates may result in significant costs to the manufacturer and a decrease in customer satisfaction. Accordingly, as described below, various embodiments relate to a firmware update process that allows for a high success rate, while remaining simple from the perspective of the firmware update developer and the user. In particular, in some embodiments, a firmware update application initiated by a firmware-to-operating system (OS) interface manages the firmware update process. The firmware update application may initiate an executable firmware update and, in some embodiments, may verify the authenticity of the update, report results to the OS, and restore a previous firmware image should the update fail. Accordingly, the firmware update may occur in a managed environment to ensure security, provide status updates to the user, allow for file management, and simplify the firmware update process. Additional embodiments and applications of such embodiments will be apparent to those of skill in the art upon reading and understanding the following description.

In the description that follows, reference is made to the term, "machine-readable storage medium." As used herein, the term "machine-readable storage medium" refers to any electronic, magnetic, optical, or other physical storage device that contains or stores executable instructions or other data (e.g., a hard disk drive, flash memory, etc.).

Figure 1:
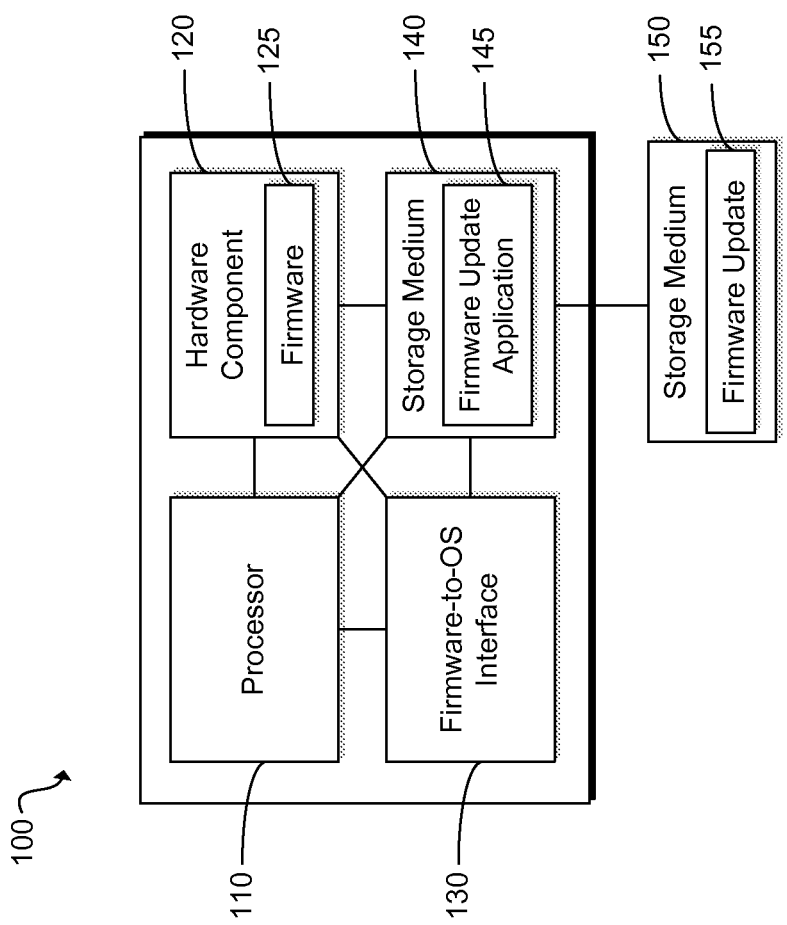
FIG. 1 is a block diagram of an embodiment of a computing device including a machine-readable storage medium encoded with instructions for executing a firmware update application.

Referring now to the drawings, in which like numerals refer to like components or steps, FIG. 1 is a block diagram of an embodiment of a computing device 100 including a machine-readable storage medium 140 encoded with instructions for executing a firmware update application 145. Computing device 100 may be, for example, a desktop computer, a laptop computer, a server, a handheld computing device, or the like. In the embodiment of FIG. 1, computing device 100 includes a processor 110, a hardware component 120, a firmware-to-OS interface 130, and machine-readable storage media 140, 150.

Processor 110 may be a central processing unit (CPU), a semiconductor-based microprocessor, or any other hardware device suitable for retrieval and execution of instructions stored in computer-readable storage media 140, 150. In particular, processor 110 may fetch, decode, and execute firmware update application 145 and firmware update 155 to implement the functionality described in detail below.

Hardware component 120 may be any physical device including mechanical, magnetic, electronic, and/or electrical parts used to implement a functionality of computing device 100. For example, hardware component 120 may be a hard disk drive, a solid state drive, an optical disk drive, a video or network card, a laptop battery, or any other physical device internally or externally coupled to computing device 100. It should be apparent that although illustrated as including only one component 120, computing device 100 may include a plurality of components 120, each including their own firmware 125.

Each hardware component 120 may include firmware 125, which may comprise a non-volatile machine-readable storage medium encoded with instructions executable by processor 110 or a processor included in component 120 (not shown) to control the functionality of hardware component 120. For example, firmware 125 may provide functions to read from or write to component 120, to manage power of component 120, and to perform other functions used during operation of component 120. When a manufacturer provides an update for firmware 125 of hardware component 120, the update may be applied using the firmware update functionality described in detail below.

Firmware-to-OS interface 130 may comprise executable instructions encoded on a machine-readable readable storage medium for providing a functional link between firmware 125 of hardware component 120 and the operating system of computing device 100. In particular, upon power-up of computing device 100, firmware-to-OS interface 130 may execute a series of instructions to initialize, configure, and test hardware component 120 and to load the operating system. In addition, firmware-to-OS interface 130 may initiate firmware update application 145 to update firmware 125 included on hardware component 120. As an example, firmware-to-OS interface 130 may detect that a firmware update 155 is available, then initiate firmware update application 145 from a predetermined location.

In some embodiments, firmware-to-OS interface 130 is an interface implemented in accordance with the Unified Extensible Firmware Interface (UEFI) specification to provide services to initialize computing device 100. As another example, firmware-to-OS interface 130 may be a UEFI interface implemented in conjunction with a Basic Input/Output System (BIOS), such that the BIOS performs initial configuration (e.g., a Power-On Self Test), while the UEFI interface performs the remaining configuration and communicates with the OS. Other suitable implementations of firmware-to-OS interface 130 will be apparent to those of skill in the art.

Machine-readable storage medium 140 may be encoded with executable instructions for running a firmware update application 145. As described above, firmware update application 145 may be initiated by firmware-to-OS interface 130 to manage the firmware update process. In some embodiments, upon initialization, firmware update application 145 may locate a firmware update 155, and then execute firmware update 155. In addition, firmware update application 145 may, for example, verify firmware update 155 prior to execution, monitor execution and provide feedback to the user (e.g., a percentage complete or time remaining), and determine whether the update was successful.

In some embodiments, firmware update application 145 may be supplied by a manufacturer of computing device 100. For example, firmware update application 145 may be included in a hard disk drive or storage medium during manufacturing or customization, such that computing device 100 may natively support the installation of firmware updates as described herein. Alternatively, an application running on computing device 100 may download firmware update application 145 to storage medium 140, either automatically or at the direction of the user.

Machine-readable storage medium 150 may be encoded with executable instructions for applying firmware update 155 to firmware 125 of hardware component 120. For example, firmware update 155 may include instructions that access and modify the storage medium containing firmware 125 using instructions supported by the controller of component 120. As a more specific example, when hardware component 120 is a hard disk drive, firmware update 155 may include instructions accepted by the hard disk drive to write to a specified section of the firmware image stored on a ROM or similar memory in the hard disk. In this manner, firmware update 155 may handle all accesses to firmware 125, while firmware update application 145 may manage the update process.

In some embodiments, firmware update 155 may be supplied by a manufacturer of hardware component 120. In this manner, the manufacturer of component 120 may include low-level instructions in firmware update 155 that access and modify the firmware without the need for the manufacturer of computing device 100 to be aware of the specific instructions. Conversely, because the manufacturer of computing device 100 may provide firmware update application 145 to manage the update process, manufacturer of component 120 may avoid the need to configure update 155 to implement a graphical user interface, receive user input, manage files, and communicate with firmware-to-OS interface 130.

In addition, in some embodiments, firmware update 155 may comply with a protocol specified by the manufacturer of computing device 100 or another entity that developed firmware update application 145, such that the firmware update 155 may return update results to firmware update application 145. In particular, the protocol may specify what information should be returned by update 155, how it should be communicated and formatted, etc. As one example, after completion, firmware update 155 may pass a number of return codes to firmware update application 145 indicating whether the update was a success or failure, reasons for any failures, and similar information.

In addition, in some embodiments, the manufacturer of hardware component 120 may develop firmware update 155 within a software development kit (SDK) designed for the particular firmware-to-OS interface 130. For example, when firmware-to-OS interface 130 is a UEFI interface, the manufacturer may utilize a UEFI SDK to develop the firmware update 155. Such embodiments are advantageous, as they eliminate the need for custom development of firmware update 155 by allowing the use of UEFI-specific Application Program Interfaces (APIs), development and debugging tools, and the like.

It should be noted that, although illustrated as external to computing device 100, storage medium 150 may also be internal to computing device 100. Thus, firmware update 155 may be stored on an internal hard disk drive, an optical disk, or another storage medium. Furthermore, although illustrated as separate devices, storage medium 140 and storage medium 150 may be the same medium, either internal or external to computing device 100. As an example, in some embodiments, firmware update application 145 and firmware update 155 may both be stored on an external storage medium, such as a flash memory drive or optical disk, such that application 145 and update 155 may be launched from the external medium. Such embodiments are advantageous, for example, in environments in which the same update will be installed on multiple computing devices 100 (e.g., by a network administrator) or in situations where application 145 is unable to launch from an internal storage medium of device 100.

Figure 2:
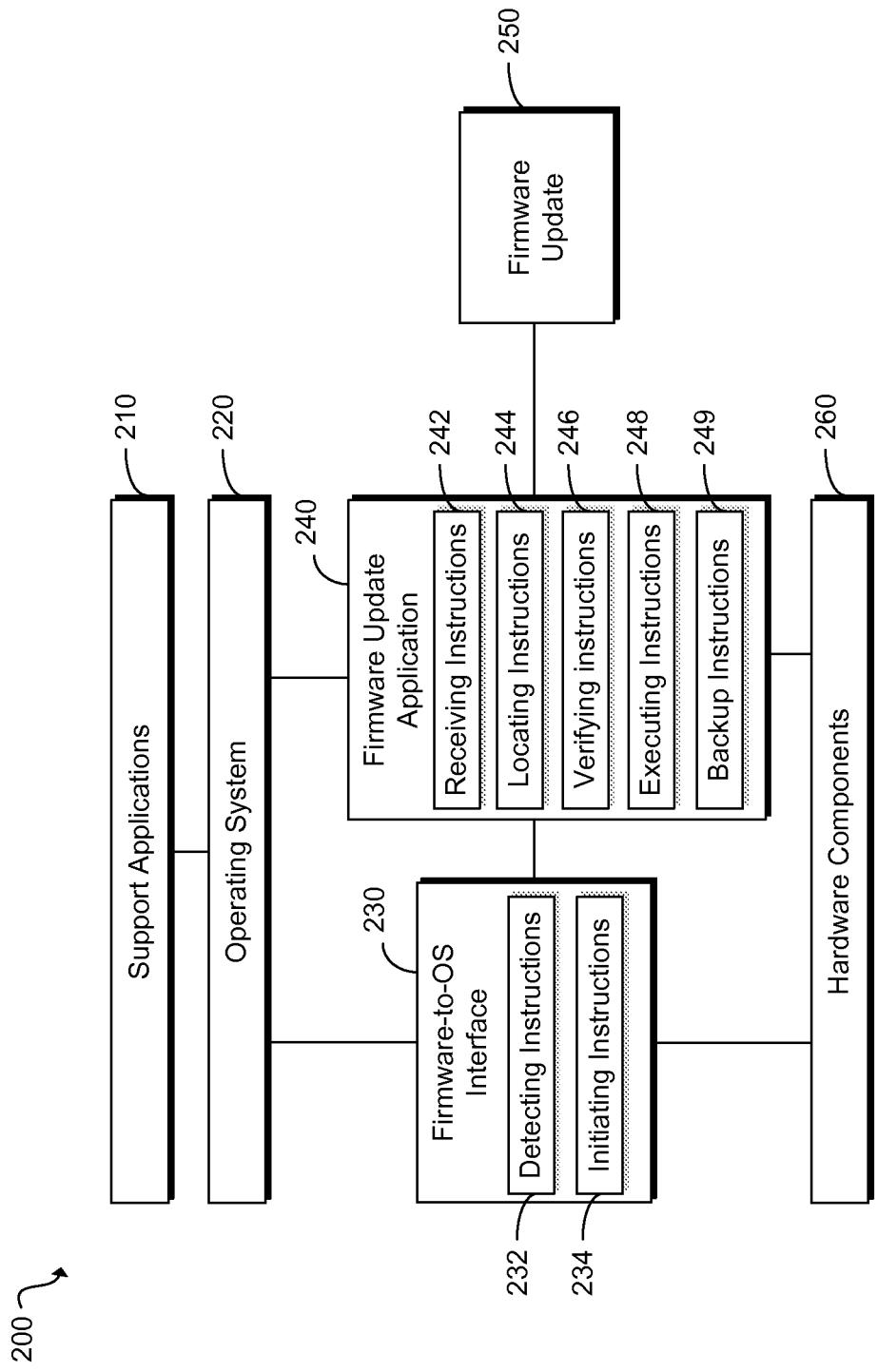
FIG. 2 is a block diagram of an embodiment of a computing device including a firmware update application for updating firmware of a hardware component.

FIG. 2 is a block diagram of an embodiment of a computing device 200 including a firmware update application 240 for updating firmware of a hardware component 260. As illustrated, computing device 200 may include support applications 210, operating system 220, firmware-to-OS interface 230, firmware update application 240, firmware update 250, and hardware components 260.

Support applications 210 may include an application configured to run in OS 220 to obtain firmware updates. As an example, a particular support application 210 may periodically poll a remote server to determine the availability of firmware updates for one or more of hardware components 260 using, for example, an identifier for each component 260. Upon determining that an update is available, support application 210 may download the update to a storage medium accessible to device 200. Alternatively, support application 210 may download and store firmware update 250 at the user's direction. As another example, the user may obtain the firmware using an Internet browser or using a different computing device.

Regardless of the method used to obtain firmware update 250, the update 250 may be stored in a location accessible to firmware update application 240. As one example, support application 210 may store the update in a dedicated partition of a hard drive or other machine-readable storage medium. In some embodiments, this partition may be hidden from the user of computing device 200, such that the user may not access firmware update 250 through operating system 220 or other means. In this manner, support application 210 may ensure that the user does not corrupt or otherwise modify firmware update 250 before it is executed.

In some embodiments, support applications 210 may also include an application to report results to the manufacturer of computing device 200, to the manufacturer of a particular hardware component 260, or to some other entity. In particular, when operating system 220 restarts after a firmware update, a support application 210 may access the results through OS 220. The support application 210 may then send the results to one or more of the manufacturers or other entities via a network connection (e.g., over the Internet).

Operating system 220 may act as a host for support applications 210 and serve as an interface between the user and hardware components 260. In some embodiments, upon storage of a firmware update by a support application 210, OS 220 may receive a notification of such storage from the application. OS 220 may then set an indication that an update should be performed upon reboot of computing device 200 and request reboot of the device. An indication may be, for example, a Boolean value, a string, a series of digits, or any other value sufficient to indicate when a firmware update 250 is available. OS 220 may store the indication in any storage location accessible to firmware-to-OS interface 230, provided that interface 230 checks this location for the indication upon boot-up. As one example, OS 220 may write the indication to a non-volatile storage medium accessible to firmware-to-OS interface 230 (e.g., a ROM of firmware-to-OS interface 230) using Windows Management Instrumentation (WMI).

In addition, in some embodiments, OS 220 may provide support applications 210 with access to results received from firmware update application 240. For example, OS 220 may retrieve firmware update results from a predetermined location, and then provide the results to support application 210. As one example, OS 220 may retrieve the results from a ROM of firmware-to-OS interface 230 using WMI. As another example, OS 220 may retrieve the results from a text file stored in a designated location.

As described above, firmware-to-OS interface 230 may comprise executable instructions encoded on a storage medium for providing a functional link between the firmware of the hardware components 260 and OS 220. In some embodiments, firmware-to-OS interface 230 may include a machine-readable storage medium encoded with detecting instructions 232 and initiating instructions 234.

Detecting instructions 232 may determine, during boot-up of computing device 200, whether a firmware update 250 is available for firmware of one or more hardware components 260. As an example, detecting instructions 232 may access the location to which OS 220 writes the indication to determine whether a firmware update is available. This location may be, for example, a predetermined location on a storage medium (e.g., a hard disk) or a location in a ROM or other storage medium used to implement firmware-to-OS interface 230.

Initiating instructions 234 may start firmware update application 240 when detecting instructions 232 determine that a firmware update is available. Initiating instructions 234 may then access a storage medium in which firmware update application 240 is stored and issue an instruction to start the application. For example, when firmware update application 240 is stored in a dedicated partition, initiating instructions 234 may be aware of this location and therefore launch the application from the partition. As another example, initiating instructions 234 may determine that firmware update application 240 is located in an external drive (e.g., flash memory), then launch the application from the external drive. Management of the firmware update process may then pass to firmware update application 240.

As described above, firmware update application 240 may comprise executable instructions encoded on a storage medium for managing the firmware update process. In some embodiments, firmware update application 240 may include receiving instructions 242, locating instructions 244, verifying instructions 246, executing instructions 248, and backup instructions 249.

Receiving instructions 242 may receive an indication to update firmware of a hardware component 260 from firmware-to-OS interface 230. For example, receiving instructions 242 may receive application parameters specified by firmware-to-OS interface 230 when launching firmware update application 240. Such parameters may specify, for example, that an update is available, identify the hardware component 260, and indicate the storage location of firmware update 250. As an alternative, receiving instructions 242 may receive the indication that an update is should be executed without the use of application parameters. For example, launching of firmware update application 240 by firmware-to-OS interface 230 may be sufficient to communicate the indication that an update is available.

Locating instructions 244 may locate a firmware update 250 in response to the indication to update the firmware. As one example, locating instructions 244 may determine the location of firmware update 250 based on an application parameter used by firmware-to-OS interface 230. As another example, when firmware update 250 is stored in a predetermined location, such as a dedicated partition, locating instructions 244 may access update 250 in that location. As yet another example, locating instructions 244 may perform a search of one or more storage media to locate firmware update 250.

Verifying instructions 246 may determine whether a firmware update 250 is valid before initiating execution of update 250. In some embodiments, verifying instructions 246 may use a digital signature corresponding to firmware update 250, which may be stored in the same location as update 250. For example, prior to releasing firmware update 250, a manufacturer of computing device 200 or hardware component 260 may calculate a hash value of update 250, and then encrypt the hash value using a private key. Prior to executing firmware update 250, firmware update application 240, which may have access to the corresponding public key, may execute verifying instructions 246 to decrypt the encrypted hash value. Verifying instructions 246 may then compare the decrypted hash value to a newly-calculated hash of firmware update 250. When these values match, verifying instructions 246 may determine that execution of firmware update 250 is authorized.

As described above, a hash value of firmware update 250 may be encrypted using a private key by a manufacturer of computing device 200. In this manner, the manufacturer of computing device 200 may verify the proper operation of firmware update 250, calculate a digital signature for firmware update 250, and then provide firmware update 250 and the signature to its customers. Such embodiments are advantageous, as the manufacturer may be the only party that is aware of the private key, thereby ensuring that only updates approved by the manufacturer will be installed by firmware update application 240. Thus, these embodiments may increase security and prevent the installation of malicious or faulty firmware updates.

Executing instructions 248 may start execution of firmware update 250 to update the firmware of the particular hardware component 260. In particular, executing instructions 248 may launch firmware update 250 from the location determined by locating instructions 244 and manage the update process. For example, executing instructions 248 may estimate and display a percentage complete to the user. Executing instructions 248 may also receive values returned by firmware update 250 indicating whether the update was successful and, if not, the reasons for the failure. In addition, upon completion of the update, executing instructions 248 may write any results to a location accessible to OS 220 (e.g., a location in a ROM of firmware-to-OS interface 230, a predetermined text file, etc.).

Backup instructions 249 may implement a backup procedure to ensure that computing device 200 remains functional in the event of a firmware update failure. In particular, prior to launching firmware update 250 by executing instructions 248, backup instructions 249 may retrieve a firmware backup from the firmware of hardware component 260 by, for example, generating a copy of the current image. Alternatively, a backup of the firmware may be obtained before execution of firmware update application 240 if, for example, the backup is downloaded with the firmware update 250. After firmware update 250 returns execution to firmware update application 240, backup instructions 249 may determine whether the update was successful and, if not, trigger restoration of the backup by starting the executable firmware backup or by copying the backup to the firmware of hardware component 260.

It should be noted, however, that firmware update 250 may include backup instructions 249. In such embodiments, firmware update 250 may include instructions to generate a backup of the firmware image prior to starting the update procedure. For example, upon initialization of firmware update 250, the backup instructions may perform the accesses required to copy the current contents of the firmware. In this manner, the manufacturer of hardware component 260 may include the appropriate access instructions in firmware update 250 without the need for the manufacturer of computing device 100 to be aware of the instructions. Firmware update 250 may also include instructions to verify the update after it is applied and to restore the backup, if necessary.

As also detailed above, firmware update 250 may be supplied by a manufacturer of hardware component 260 as a file executable by firmware update application 240. Hardware component 260 may be any device including mechanical, magnetic, electronic, and/or electrical parts used to implement a functionality of computing device 200. Although not illustrated as a separate block, a processor for execution of instructions may be included in hardware components 260.

Figure 3:
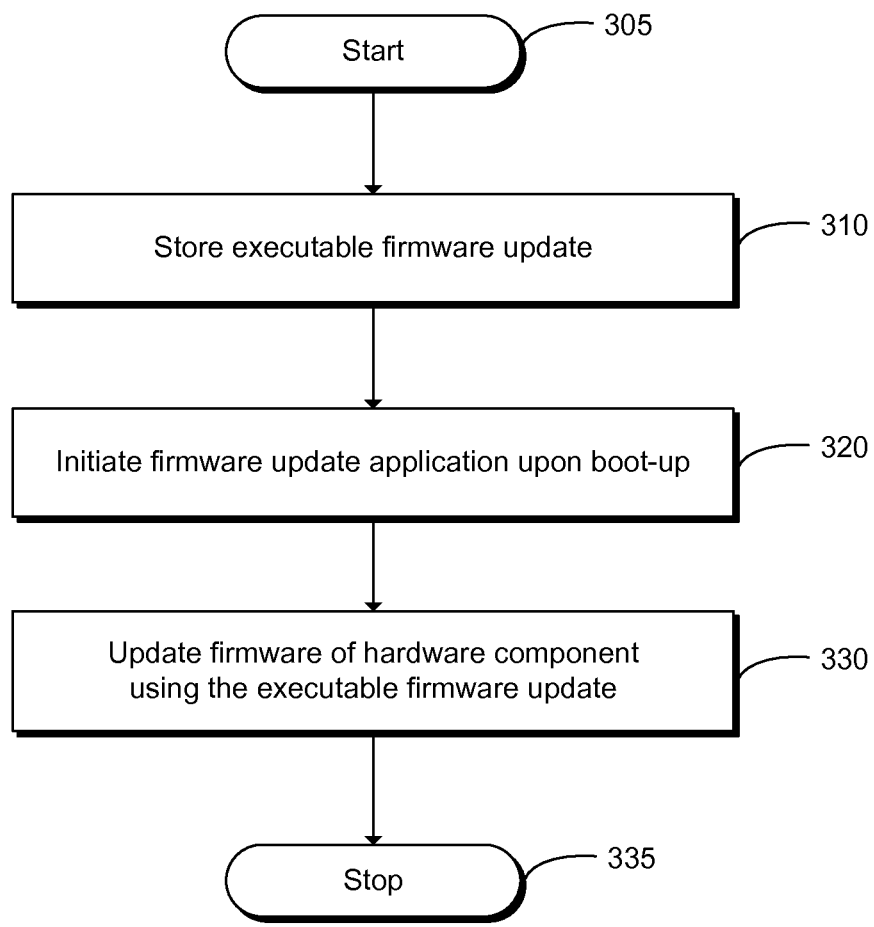
FIG. 3 is flowchart of an example of a method for updating firmware of a hardware component.

FIG. 3 is flowchart of an example of a method 300 for updating firmware of a hardware component. Although execution of method 300 is described below with reference to the components of computing device 100, other suitable components for execution of method 300 will be apparent to those of skill in the art. Method 300 may be implemented in the form of executable instructions stored on a machine-readable storage medium.

Method 300 may start in block 305 and proceed to block 310, where a firmware update 155 may be stored on a machine-readable storage medium accessible to computing device 100. As one example, processor 110 may execute instructions provided by an operating system of computing device 100 to store firmware update 155 on a hard disk or other internal or external storage device. As another example, a user may manually copy firmware update 155 to the machine-readable medium.

Method 300 may then proceed to block 320, where firmware-to-OS interface 130 may initiate firmware update application 145 upon boot-up of computing device 100. In particular, firmware-to-OS interface 130 may access the storage medium in which firmware update application 145 is stored and trigger execution of firmware update application 145 by processor 110.

After initiation of firmware update application 145, method 300 may proceed to block 330, where firmware update application 145 may trigger update of firmware 125 of firmware component 120 by starting execution of firmware update 155. In particular, processor 110 may execute firmware update 155 to access and modify the storage medium containing firmware 125. After completion of firmware update 155, execution may then return to firmware update application 145. Finally, method 300 may proceed to block 335, where method 300 stops.

Figure 4A:
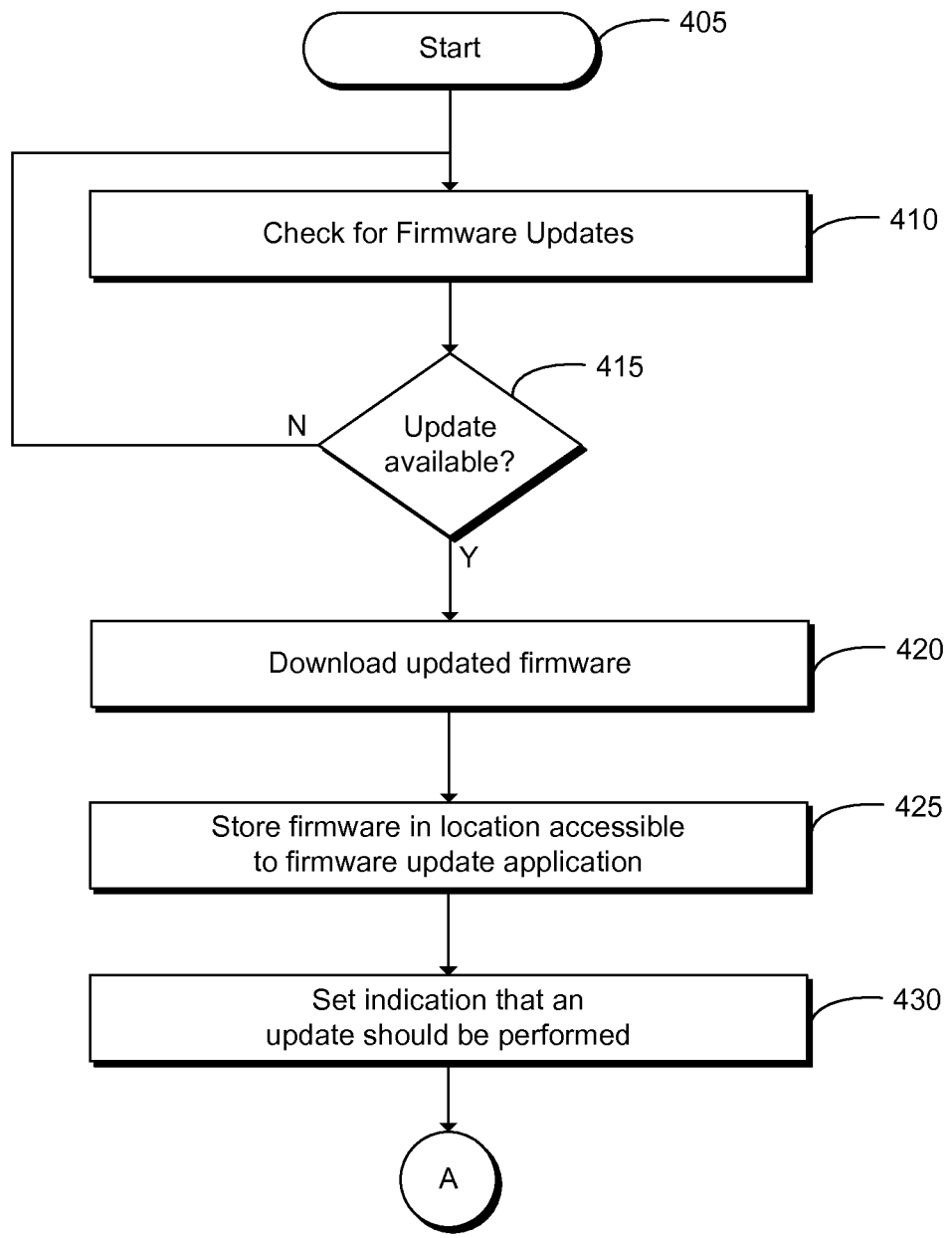
FIGS. 4A and 4B are flowcharts of an example of a method for updating firmware of a hardware component performed by an operating system.
Figure 4B:
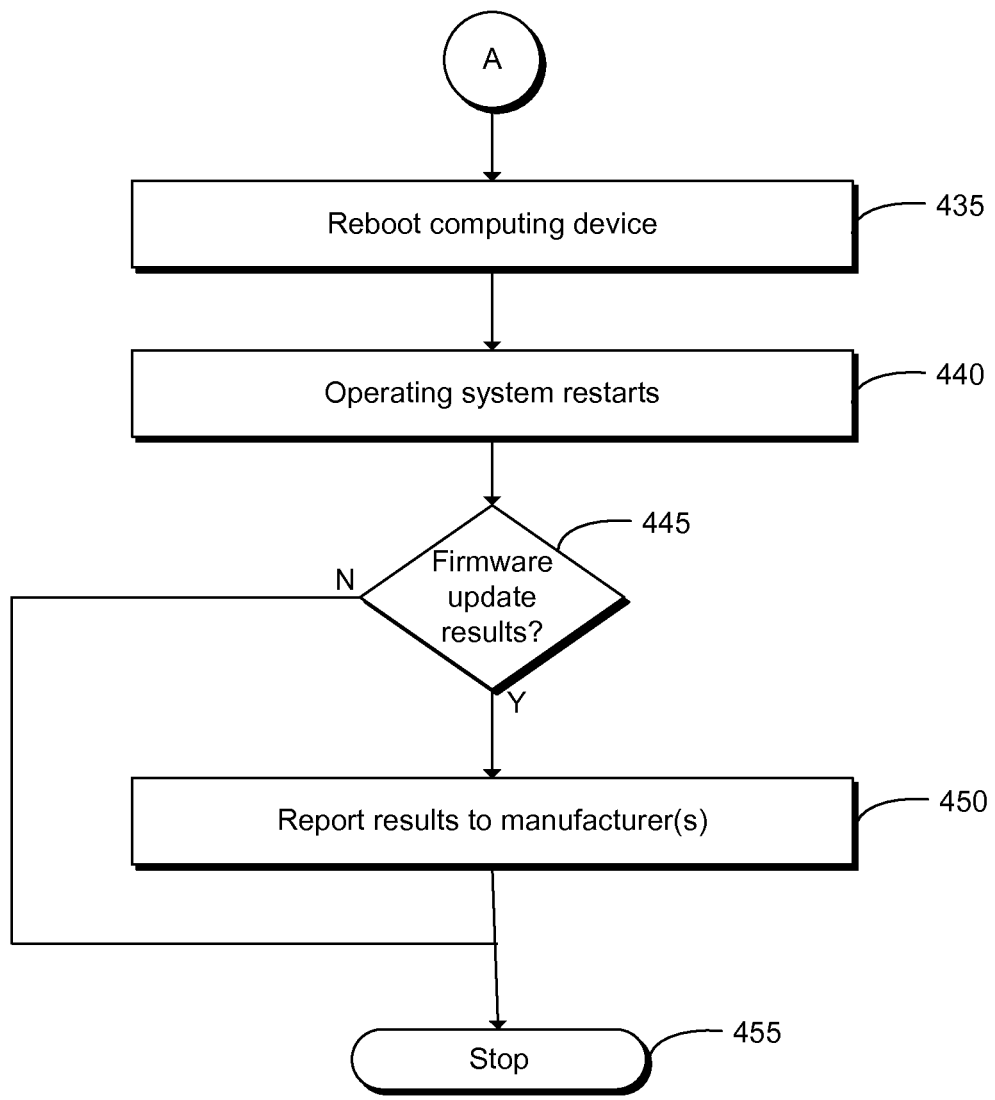

FIGS. 4A and 4B are flowcharts of an example of a method 400 for updating firmware of a hardware component performed by an operating system. Although execution of method 400 is described below with reference to the components of computing device 200, other suitable components for execution of method 400 will be apparent to those of skill in the art. Method 400 may be implemented in the form of executable instructions stored on a machine-readable storage medium.

Method 400 may start in block 405 and proceed to block 410, where a support application 210 may check for firmware updates for one or more hardware components 260 included in the computing device. As detailed above, support application 210 may perform this check by, for example, periodically querying a remote server. Method 400 may then proceed to block 415, where support application 210 may determine whether a firmware update is available.

When it is determined that no updates are available for hardware components 260 of computing device 200, method 400 may return to block 410, where support application 210 may check for firmware updates after a predetermined time period has elapsed. Alternatively, when an update is available, method 400 may proceed to block 420.

In block 420, support application 210 may download firmware update 250 from a remote server to a storage medium accessible to computing device 200. Method 400 may then proceed to block 425, where support application 210 may store firmware update 250 in a location accessible to firmware update application 240. As an example, support application 210 may store the update in a predetermined directory or in a dedicated partition of a hard drive or other machine-readable storage medium.

After storing firmware update 250, method 400 may proceed to block 430, where operating system 220 may set an indication that an update should be performed. It should be noted that, in some embodiments, execution of method 400 may skip directly to block 430. For example, in situations in which a user has manually stored firmware update 250 in a location accessible to firmware update application 240, execution of blocks 410, 415, 420, and 425 may be skipped. Regardless, in block 430, OS 220 may store an indication that an update should be performed in a location known to firmware-to-OS interface 230. Method 400 may then proceed to block 435, described in detail below with reference to FIG. 4B.

Referring now to FIG. 4B, in block 435, computing device 200 may be rebooted at the request of OS 220 or restarted manually by the user. As described in detail below in connection with FIGS. 5A and 5B, firmware-to-OS interface 230, firmware update application 240, and firmware update 250 may then attempt to update the firmware of a hardware component 260. After the attempt to update the firmware, computing device 200 may then restart OS 220 in block 440.

After initialization of OS 220, method 400 may proceed to block 445, where support application 210 may access a predetermined location to determine whether firmware results are available. For example, support application 210 may access, through OS 220, an interface of firmware-to-OS interface 230 that provides firmware update results. As another example, support application 210 may read the results from a text file accessible in a designated location.

When it is determined in block 445 that firmware update results are not available, method 400 may proceed to block 455, where method 400 stops. Such a scenario is possible, for example, if the user indicates, during boot-up, that firmware update application 240 should not be launched, such that no update results would be present.

Alternatively, when it is determined in block 445 that firmware update results are available, method 400 may proceed to block 450, where support application 210 may report the results to one or more manufacturers or other entities. For example, support application 210 may report the results to a manufacturer of computing device 200 and/or a manufacturer of hardware component 260. These results may include, for example, whether the update was successful, a time the update was applied, and an amount of time required to apply the update. If the update failed, the results may also include failure details (e.g., invalid signature, failure during the process, user aborted the process, etc.). Method 400 may then proceed to block 455, where method 400 stops.

Figure 5A:
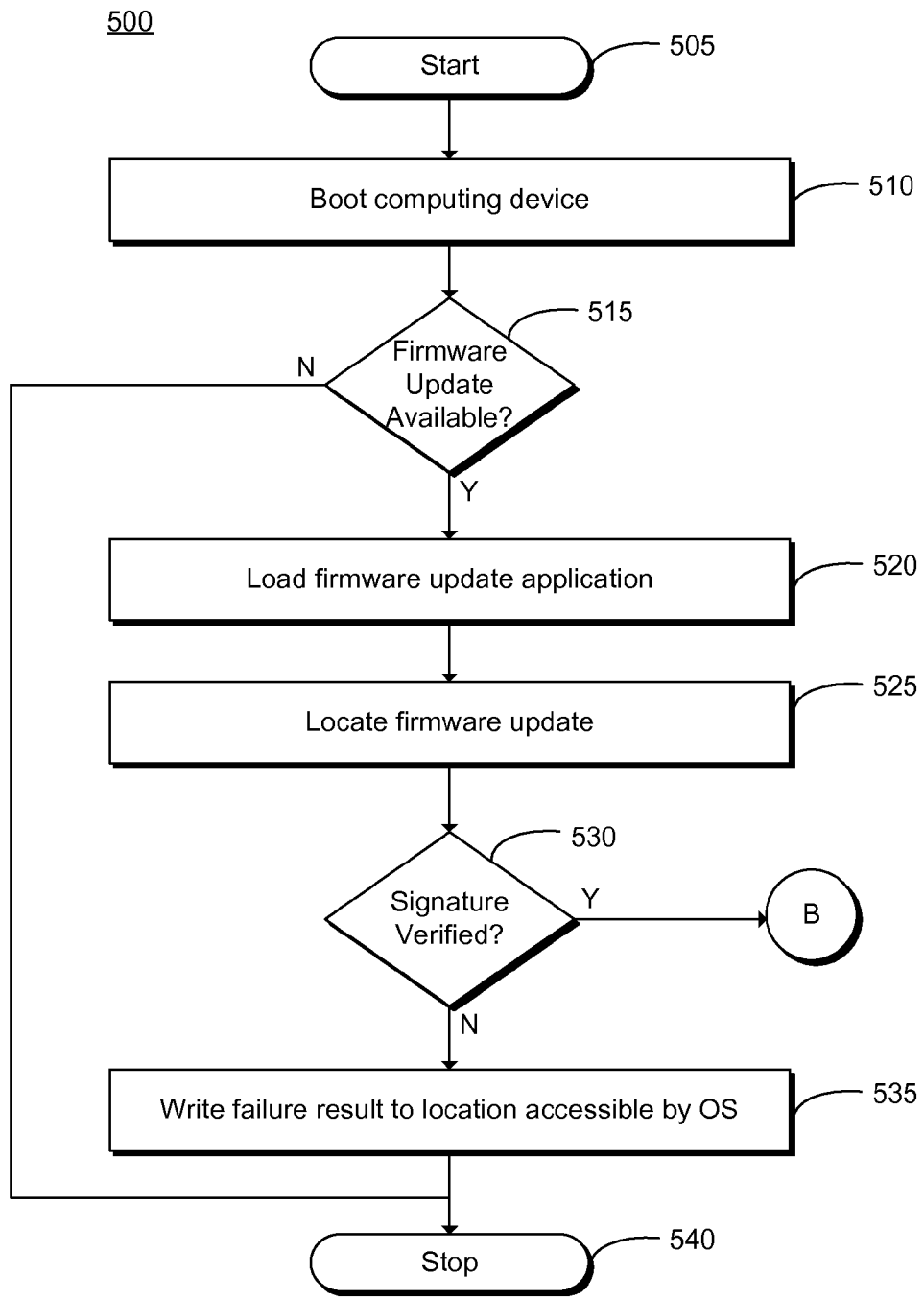
FIGS. 5A and 5B are flowcharts of an example of a method for updating firmware of a hardware component performed upon boot-up of a computing device.
Figure 5B:
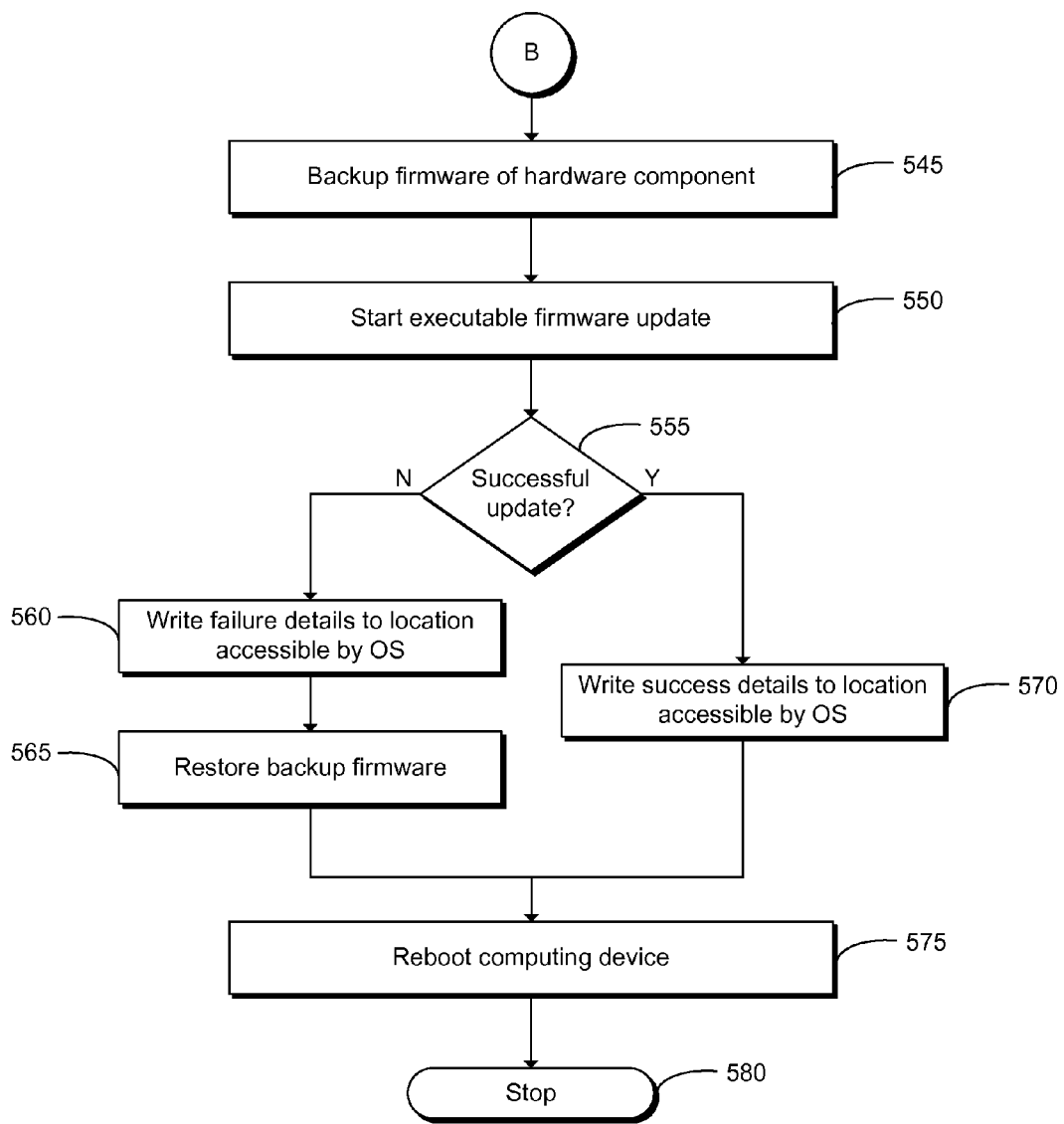

FIGS. 5A and 5B are flowcharts of an example of a method 500 for updating firmware of a hardware component performed upon boot-up of a computing device. Although execution of method 500 is described below with reference to the components of computing device 200, other suitable components for execution of method 500 will be apparent to those of skill in the art. Method 500 may be implemented in the form of executable instructions stored on a machine-readable storage medium.

Method 500 may start in block 505 and proceed to block 510, where computing device 200 may be booted. In particular, power may be provided to hardware components 260 of computing device 200 and firmware-to-OS interface 230 may perform initialization and configuration of those components 260. Method 500 may then proceed to block 515, where firmware-to-OS interface 230 may determine whether a firmware update is available for installation. As an example, firmware-to-OS interface 230 may access the location to which OS 220 writes an indication that an update is available. This location may be, for example, a predetermined location on a storage medium or a location in a ROM or other storage medium used to implement firmware-to-OS interface 230. Alternatively, a user of computing device 200 may manually trigger installation of a firmware update by pressing a predetermined key upon boot-up of device 200.

When it is determined in block 515 that a firmware update is not available, method 500 may proceed to block 540, where method 540 stops and firmware-to-OS interface 230 continues its normal operations to load OS 220. Alternatively, when it is determined that a firmware update is available, method 500 may proceed to block 520. In block 520, firmware-to-OS interface 230 may load firmware update application 240 to begin the firmware update process. It should be noted that firmware-to-OS interface 230 may load firmware update application 240 from any machine-readable medium, whether internal or external to computing device 200. Method 500 may then proceed to block 525.

In block 525, firmware update application 240 may locate firmware update 250. As detailed above, firmware update application 240 may determine the location of firmware update 250 based on an application parameter used by firmware-to-OS interface 230, by accessing a predetermined location, or by performing a search. Other suitable methods for locating firmware update 250 will be apparent to those of skill in the art.

After locating firmware update 250, method 500 may proceed to block 530, where firmware update application 240 may attempt to verify a digital signature associated with firmware update 250. As one example, also detailed above, firmware update application 240 may use a public key to decrypt a hash value encrypted with a corresponding private key, and then compare the decrypted hash value to a calculated hash of firmware update 250. In this example, firmware update application 240 may determine that firmware update 250 is valid when the hash values match.

When it is determined in block 530 that the signature is verified and that firmware update 250 is therefore valid, method 500 may proceed to block 545, described in detail below in connection with FIG. 5B. Alternatively, method 500 may proceed to block 535, where firmware update application 240 may write a failure result to a location accessible to OS 220, indicating that the firmware update failed due to failed verification of firmware update 250. Method 500 may then proceed to block 540, where method 540 stops and firmware-to-OS interface 230 continues its normal operations to load OS 220.

Referring now to FIG. 5B, in block 545, prior to execution of update 250, firmware update application 240 may create a backup of the firmware of the hardware component 260 to be updated. As an example, firmware update application 240 may generate a copy of the current image stored on the firmware of hardware component 260. As another example, the backup may be obtained prior to execution of firmware update application 240, such that firmware update application 240 need not generate the backup. Alternatively, a backup of the firmware of hardware component 260 may be performed by firmware update 250 after execution is started.

Method 500 may then proceed to block 550, where firmware update application 240 may start execution of firmware update 250. Firmware update 250 may then modify the firmware of hardware component 260 as necessary. In this manner, because firmware update application 240 launches firmware update 250, application 240 may manage the update process. For example, firmware update application 240 may display an estimated time remaining and receive feedback from firmware update 250 indicating the results of the update.

After execution of firmware update 250 has completed, method 500 may proceed to block 555, where firmware update application 240 may determine whether the update was successful. As an example, firmware update application 240 may receive one or more return codes from firmware update 250 indicating whether the update was successful and, if the update was unsuccessful, one or more reasons for the failure.

When it is determined in block 555 that the update was not successful, method 500 may proceed to block 560, where firmware update application 240 may write details of the failure to a location accessible by OS 220. Method 500 may then proceed to block 565, where firmware update application 240 may initiate restoration of the backup by starting the executable firmware backup or by copying the backup to the firmware of hardware component 260. Method 500 may then proceed to block 575.

Alternatively, when it is determined in block 555 that the update was successful, method 500 may proceed to block 570. In block 570, firmware update application 240 may write details of the success (e.g., a date and time, duration of the update, a firmware version number, etc.) to a location accessible by OS 220. Method 500 may then proceed to block 575.

In block 575, computing device 200 may be rebooted, such that the changes to the firmware of hardware component 260, if any, may be applied. Method 500 may then proceed to block 580, where method 500 stops.

According to the foregoing, example embodiments disclosed herein provide a firmware update application initiated by a firmware-to-OS interface that executes a firmware update and manages the firmware update process. In this manner, the firmware update application may verify the firmware update, provide feedback to the user, and report results to the OS. In addition, because the update application may be executed within the firmware-to-OS interface, the update application may have access to hard disk drives and other storage devices, such that it may run an update from numerous locations and perform file management operations. Development of the update may also be simplified, as, in some embodiments, the component manufacturer may provide the executable needed to modify the firmware, while the computing device manufacturer may provide the environment for execution of the update. Accordingly, example embodiments provide for a reliable, user-friendly firmware update process that increases customer satisfaction, while decreasing expenses incurred by the system and component manufacturers.

I claim:

1. A method for updating firmware of a hardware component included in a computing device, the method comprising:
   storing, by the computing device, an executable firmware update for the hardware component on a machine-readable storage medium;
   setting, by an operating system (OS) of the computing device, an indication that an update of the firmware of the hardware component should be performed upon reboot;
   upon boot-up of the computing device, initiating a firmware update application by a firmware-to-operating system (OS) interface in response to detection of the indication by the firmware-to-OS interface of the computing device;
   triggering, by the firmware update application, the update of the firmware of the hardware component by starting execution of the executable firmware update;
   writing results of the update of the firmware to a location accessible to the OS, wherein the results indicate a failure of the update of the firmware responsive to failure of the update of the firmware; and
   reporting, by an application running in an environment of the OS, the results to an entity that is external of the computing device.

2. The method of claim 1, wherein the firmware-to-OS interface is a Unified Extensible Firmware Interface (UEFI).

3. The method of claim 1, wherein:
   the storing is performed by the application running in the environment of the OS.

4. The method of claim 1, wherein:
   the firmware update application is provided by a manufacturer of the computing device, and the executable firmware update is provided by a manufacturer of the hardware component.

5. The method of claim 4, wherein the executable firmware update complies with an application protocol specified by the manufacturer of the computing device to return results to the firmware update application.

6. The method of claim 4, wherein the executable firmware update is developed by the manufacturer of the hardware component using a software development kit (SDK) designed for the firmware-to-OS interface.

7. The method of claim 1,
   wherein the reporting comprises reporting, by the application running in the environment of the OS, the results to the entity that is at least one of a manufacturer of the computing device and a manufacturer of the hardware component.

8. The method of claim 1, further comprising:
   storing a firmware backup for the hardware component on the machine-readable storage medium; and
   triggering, upon detection of a failure of the update, restoration of the firmware of the hardware component using the firmware backup.

9. A computing device comprising:
   at least one processor; and
   a non-transitory machine-readable storage medium encoded with instructions executable by the at least one processor to:
      set, by an operating system (OS) of the computing device, an indication that an update of a firmware of a hardware component of the computing device should be performed upon reboot;
      detect, during boot-up of the computing device, the indication;
      in response to detecting the indication, initiate a firmware update application by a firmware-to-operating system (OS) interface;
      update the firmware of the hardware component by starting an executable firmware update by the firmware update application;
      write results of the update of the firmware to a location accessible to the OS, wherein the results indicate a failure of the update of the firmware responsive to failure of the update of the firmware; and
      cause reporting, by an application running in an environment of the OS, the results to an entity that is external of the computing device.

10. The computing device of claim 9, wherein the executable firmware update is located in a partition of the machine-readable storage medium hidden from a user of the computing device.

11. The computing device of claim 9, wherein the executable firmware update includes instructions that access and modify the firmware of the hardware component.

12. The computing device of claim 9, wherein the instructions are executable by the at least one processor to:
   store, by the application running in an environment of the OS, the executable firmware update, prior to the boot-up.

13. The computing device of claim 9, wherein the reporting of the results to the entity comprises reporting the results to at least one of a manufacturer of the computing device and a manufacturer of the hardware component.

14. A non-transitory machine-readable storage medium encoded with instructions executable by a computing device to:

set, by an operating system (OS) of the computing device, an indication that an update of a firmware of a hardware component of the computing device should be performed upon reboot;

upon boot-up of the computing device, initiate a firmware update application by a firmware-to-operating system (OS) interface of the computing device, in response to the firmware-to-OS interface detecting the indication;

locate, by the firmware update application, an executable firmware update;

start, by the firmware update application, execution of the executable firmware update to update the firmware of the hardware component;

write results of the update of the firmware to a location accessible to the OS, wherein the results indicate a failure of the update of the firmware responsive to failure of the update of the firmware; and cause reporting, by an application running in an environment of the OS, the results to an entity that is external of the computing device.

15. The non-transitory machine-readable storage medium of claim 14, wherein the instructions are executable to cause the computing device to further:

verify the executable firmware update using a digital signature stored on the machine-readable storage medium prior to starting the execution.

16. The non-transitory machine-readable storage medium of claim 14, wherein the instructions are executable by the computing device to:

store, by the application running in the environment of the OS, the executable firmware update, prior to the boot-up.

17. The non-transitory machine-readable storage medium of claim 14, wherein the reporting of the results to the entity comprises reporting the results to at least one of a manufacturer of the computing device and a manufacturer of the hardware component.

\* \* \* \* \*